United States Patent
Nakatsu

(10) Patent No.: US 10,244,214 B2
(45) Date of Patent: Mar. 26, 2019

(54) IMAGE CAPTURING APPARATUS

(71) Applicant: CANON KABUSHIKI KAISHA, Tokyo (JP)

(72) Inventor: Haruhiko Nakatsu, Moriya (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 15/240,812

(22) Filed: Aug. 18, 2016

(65) Prior Publication Data

US 2017/0064266 A1   Mar. 2, 2017

(30) Foreign Application Priority Data

Aug. 28, 2015 (JP) ................. 2015-196929

(51) Int. Cl.
| | | |
|---|---|---|
| *H04N 9/31* | (2006.01) | |
| *G06F 3/042* | (2006.01) | |
| *G06F 3/0488* | (2013.01) | |
| *H04N 5/225* | (2006.01) | |

(52) U.S. Cl.
CPC ......... *H04N 9/3144* (2013.01); *G06F 3/0425* (2013.01); *G06F 3/04883* (2013.01); *H04N 5/2256* (2013.01); *H04N 5/2252* (2013.01); *H04N 5/2254* (2013.01)

(58) Field of Classification Search
CPC . G06F 3/0425; G06F 3/04883; H04N 5/2252; H04N 5/2254; H04N 5/2256; H04N 9/3144
See application file for complete search history.

(56) References Cited

U.S. PATENT DOCUMENTS

| | | | | |
|---|---|---|---|---|
| 4,758,093 A | * | 7/1988 | Stern ...................... | G01B 11/00 356/608 |
| 6,394,608 B1 | * | 5/2002 | Shiraishi ........... | G02F 1/133385 348/E5.141 |
| 8,562,143 B2 | | 10/2013 | Miyazaki | |
| 9,298,320 B2 | * | 3/2016 | McCaughan ......... | G06F 3/0304 |
| 9,423,677 B2 | * | 8/2016 | Mikawa ................ | G03B 21/16 |
| 2008/0013049 A1 | * | 1/2008 | Nishikawa ............. | G02B 27/22 353/7 |
| 2011/0032215 A1 | * | 2/2011 | Sirotich ................ | G06F 3/0425 345/175 |
| 2011/0188008 A1 | * | 8/2011 | Maeda ................... | G03B 21/28 353/85 |
| 2014/0232695 A1 | * | 8/2014 | McGaughan ......... | G06F 3/0426 345/175 |
| 2014/0368835 A1 | * | 12/2014 | Tabata ................. | G01B 11/245 356/612 |

FOREIGN PATENT DOCUMENTS

JP   2000112021 A   4/2000

\* cited by examiner

*Primary Examiner* — Peter D Le
(74) *Attorney, Agent, or Firm* — Canon U.S.A., Inc. IP Division

(57) ABSTRACT

An image capturing apparatus includes a projector and a camera. The projector includes a light source unit and a projector lens barrel unit. The camera includes a camera lens barrel unit. As viewed in a direction that is orthogonal to a direction toward which an optical axis of the projector travels, the projector lens barrel unit is arranged to overlap with the camera lens barrel unit, and the light source unit is arranged so as not to overlap with the camera. A duct via which air to be blown to the light source travels is arranged in such a manner that the air travels in a direction orthogonal to the direction toward which the optical axis of the projector travels.

6 Claims, 14 Drawing Sheets

IMAGE CAPTURING APPARATUS

BACKGROUND OF THE INVENTION

Field of the Invention

The present invention relates to an image capturing apparatus including an image capturing unit that captures an image of a target object.

Description of the Related Art

Conventionally known projectors project an image (image information) onto an external screen.

Japanese Patent Application Laid-Open. No. 2000-112021 discusses a projection display apparatus including a light source, a lens group, and the like for projecting an image onto a screen, and a screen sensor for detecting a pointer and the like projected on the screen. The screen sensor includes an area sensor, such as a charge coupled device (CCD) sensor, and an imaging lens. The screen sensor detects an amount of light projected on a display area, positions and sizes of the screen and a projected image, a mark pointed on the projection surface by using a laser pointer and the like.

Incidentally, an excessive increase in a temperature of a light source of a projector may shorten the service life of a projector. Thus, cooling mechanisms that cool light sources have been conventionally known. U.S. Pat. No. 8,562,143 discusses a configuration in which a light source is cooled by applying cooling air to the light source using a fan.

Further, Japanese Patent Application Laid-Open No. 2000-112021 discusses a projection display apparatus including a light source for the image projection and a screen sensor (a lens barrel including the area sensor, such as the CCD sensor, and the imaging lens) that are contained in a single casing.

In a more downsized apparatus, an area sensor or a lens barrel is disposed closer to a light source. In such a configuration, the area sensor or the lens barrel has a higher risk of being heated by heat emitted from the light source. When the lens barrel is heated, a refractive index of the lens changes. Further, defocusing occurs due to thermally expansion of the lens barrel. As a result, an imaging performance of the area sensor is degraded. When the area sensor is heated, there is a possibility that photoelectric conversion characteristics of the area sensor may be changed, and thereby noise image information may be obtained.

As such, there is the conventional technique whereby a light source is cooled using a fan. However, the technique is problematic in that the cooling air heated by the light source may be blown onto the area sensor and the lens barrel to heat them and thereby an imaging function may be degraded.

SUMMARY OF THE INVENTION

According to an aspect of the present invention, an image capturing apparatus includes a projection unit that includes a light source and a projection lens barrel unit, and is configured to project an image onto a projection surface, an image capturing unit configured to capture an image of a target object placed on the projection surface, an imaging lens barrel unit in which the image of the target object is formed by the image capturing unit, an air blowing unit configured to blow air for cooling the light source, and a duct through which the air blown by the air blowing unit is guided to the light source, wherein, when an optical axis of the image capturing unit is projected onto the projection surface, a direction toward which the optical axis travels is defined as a first direction, and a direction that is orthogonal to the first direction is defined as a second direction, wherein, as viewed in the second direction, the projection lens barrel unit is arranged to overlap with the imaging lens barrel unit, and the light source is arranged so as not to overlap with the image capturing unit and the imaging lens barrel unit, and wherein the duct is arranged in such a manner that the air blown from the air blowing unit travels in a direction orthogonal to the first direction.

Further features of the present invention will become apparent from the following description of exemplary embodiments with reference to the attached drawings.

DESCRIPTION OF THE EMBODIMENTS

A first exemplary embodiment of the present invention will be described in detail below with reference to the attached drawings. It is to be noted that the components described in the following exemplary embodiments are merely examples, and do not limit the scope of the present invention.

<Used State of Information Processing Apparatus 109>

Figure 1:
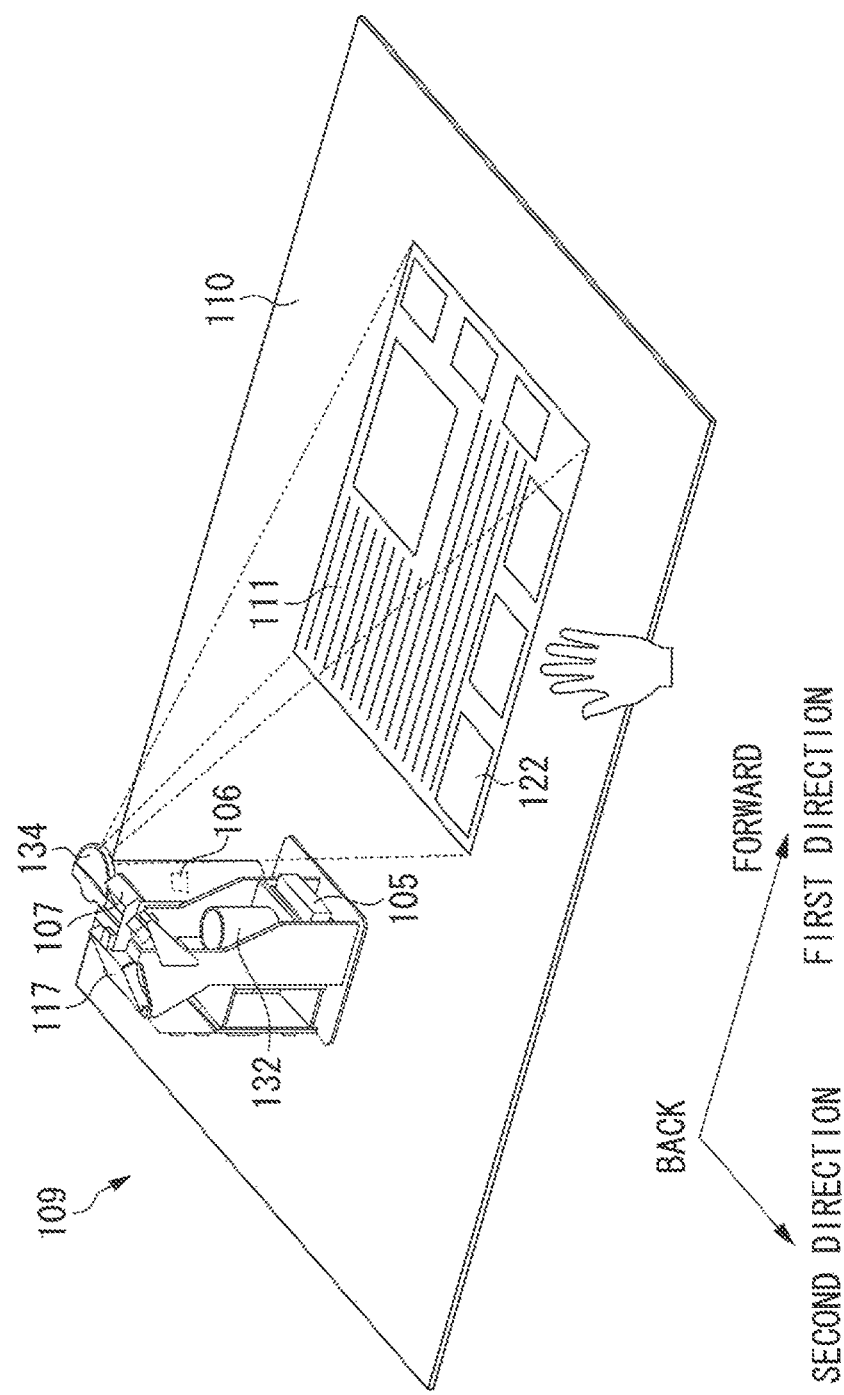
FIG. 1 is a schematic view of an information processing apparatus according to a first exemplary embodiment, in a used state.

FIG. 1 is a diagram illustrating an information processing apparatus 109 which is the image capturing apparatus according to the present exemplary embodiment, in a used state.

Figure 2:
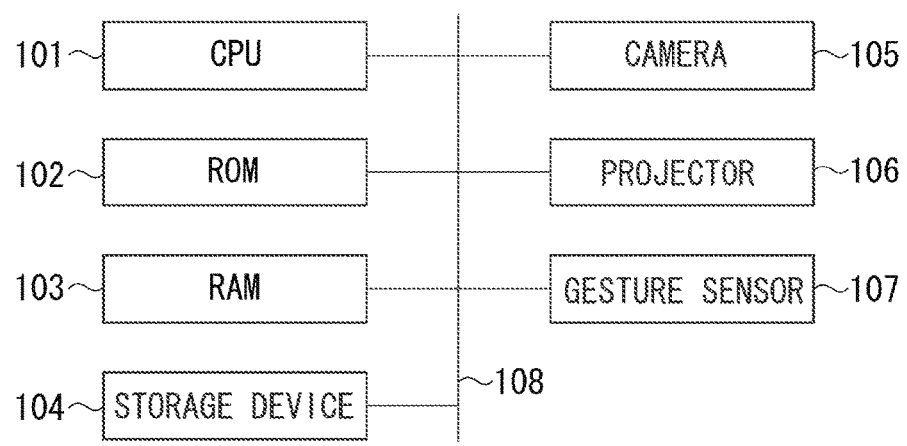
FIG. 2 is a diagram illustrating a hardware configuration of the information processing apparatus according to the first exemplary embodiment.
Figure 4:
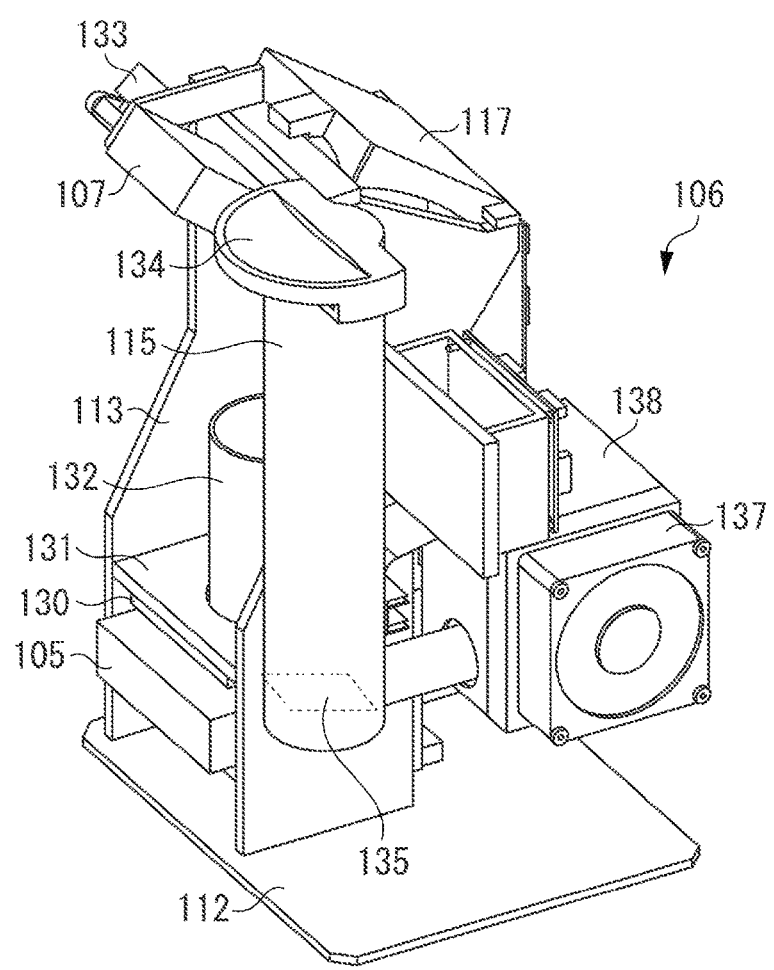
FIG. 4 is a perspective view of the information processing apparatus according to the first exemplary embodiment.

The information processing apparatus 109 includes a projector 106 as a projection unit, a gesture sensor 107 as a detection unit, and a camera 105 as an image capturing unit (see FIGS. 2 and 4).

The projector 106 projects an image 111 onto a projection surface 110.

A user performs an operation with respect to the image 111.

The projected image 111 includes a menu button 122. A user performs an operation for turning on or off the power or other selecting operations with the user's finger.

The selecting operation performed by the user is detected by the gesture sensor 107, and thus the image 111 serves as an interface.

When the user wants to capture an image of a document or the like, the user places an image capture target object (i.e. the document or the like) document on the projection surface 110, and captures the image of the target object with the camera 105.

A side of the apparatus main body from which an image is projected from the projector 106 is defined as a forward side of the apparatus main body. A side opposite to the forward side is defined as a back side of the apparatus main body. Sides on the left and right of the apparatus main body, as viewed from the forward side, are respectively defined as a left side and a right side.

<Configuration of Information Processing Apparatus 109>

FIG. 2 is a diagram illustrating a hardware configuration of the information processing apparatus 109 according to the present exemplary embodiment. Referring to FIG. 2, a central processing unit (CPU) 101 that includes a microcomputer performs calculations and logical determinations for various types of processing, and controls components connected to a system bus 108. A read only memory (ROM) 102 is a program memory that stores a program used by the CPU 101 to perform the control. A random access memory (RAM) 103 is a data memory and includes a work area used by the CPU 101 to execute the program, a save area for data used when an error is processed, a load area for the control program, and the like.

A storage device 104 is a hard disk, a storage device connected to the outside, or the like, and stores various types of data, such as electronic data, and a program according to the present exemplary embodiment. The camera 105 that serves as the image capturing unit captures an image of a target object existing in a work area where the user performs an operation, and provides the image to a system as an input image.

The projector 106 that serves as the projection unit projects an image including electronic data and a user interface onto the projection surface 110. The gesture sensor 107 is a red green blue (RGB) camera or a monochrome CCD camera. The gesture sensor 107 detects a movement of a detection target such as a hand of the user in the work space. Whether the user has touched an operation button and the like projected on the projection surface 110 (see FIG. 1) is detected based on the result of the detection.

In the present exemplary embodiment, the projection surface 110 is a flat surface positioned below the information processing apparatus 109. For example, the projection surface 110 is a surface of a table on which the information processing apparatus 109 is placed. Alternatively, the information processing apparatus 109 may be configured to include the projection surface 110 as a part of the information processing apparatus 109. For example, a base 112 of the information processing apparatus 109 may be extended to have a space onto which the image 111 can be projected from the projector 106.

Figure 3:
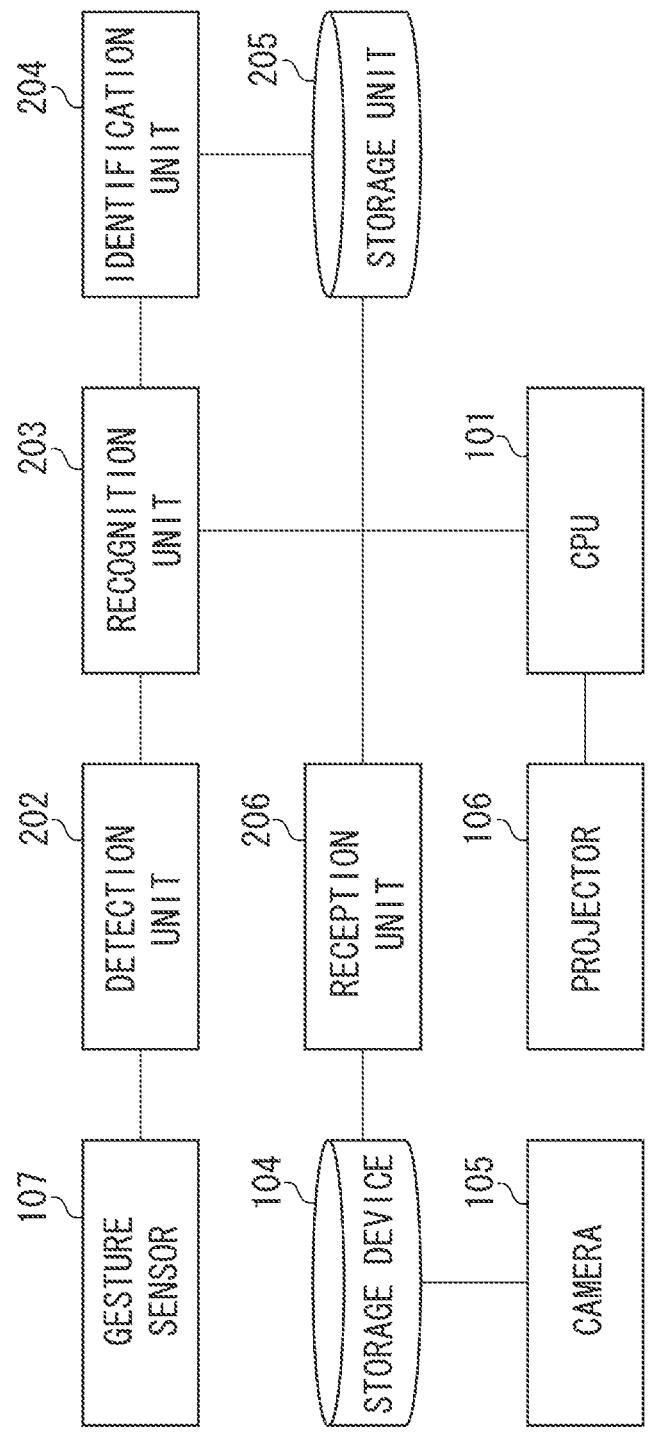
FIG. 3 is a diagram illustrating a functional configuration of the information processing apparatus according to the first exemplary embodiment.

FIG. 3 is a diagram illustrating a functional configuration of the information processing apparatus 109 according to the present exemplary embodiment. Referring to FIG. 3, the camera 105 captures an image of a target object placed on the projection surface 110 such as a hand written text document prepared by the user, and identifies the letters included in the document. The projector 106 projects the image 111 serving as the user interface and the like onto the projection surface 110 (see FIG. 1). The projector 106 is also capable of projecting the image captured by the camera 105. The gesture sensor 107 detects, in the work space on the projection surface 110 (see FIG. 1), an operation performed by the user's hand and the like with respect to the user interface and the like that is projected by the projector 106 on the projection surface 110.

In response to the user's operating the user interface with the user's hand and the like, the image 111 projected by the projector 106 is changed or an image capture by the camera 105 is performed. A detection unit 202 is implemented by the CPU 101, the RUM 102 and the RAM 103 (hereinafter, collectively referred to as the CPU 101 and the like) and detects an area where the hand of the user exists and an area where a finger of the hand of the user exists, based on a detection signal from the gesture sensor 107.

A recognition unit 203 is implemented by the CPU 101 and the like. The recognition unit 203 tracks the hand and the finger of the user detected by the gesture sensor 107 and the detection unit 202, and recognizes a gesture operation performed by the user. An identification unit 204 is implemented by the CPU 101 and the like and identifies which of the fingers of the user has been used to perform the operation recognized by the recognition unit 203. A storage unit 205 is implemented by the CPU 101 and the like and stores information on one of objects included in the projected electronic data that has been designated by the user through the gesture operation, in the storage area in the RAM 103. The information is stored while being associated with the finger used to perform the gesture operation.

A reception unit 206 is implemented by the CPU 101 and the like. The reception unit 206 receives an editing operation performed with respect to the electronic data through the gesture operation recognized by the recognition unit 203, and updates the electronic data stored in the storage device 104 as appropriate. The storage device 104 stores the electronic data as a target of the editing operation. The CPU 101 refers to information stored in the storage unit 205 in accordance with the gesture operation recognized by the recognition unit 203, and generates a projection image to be projected onto the work space. The projector 106 projects the is image generated by CPU 101 onto the projection surface 110.

<Configuration of Camera 105>

Figure 5:
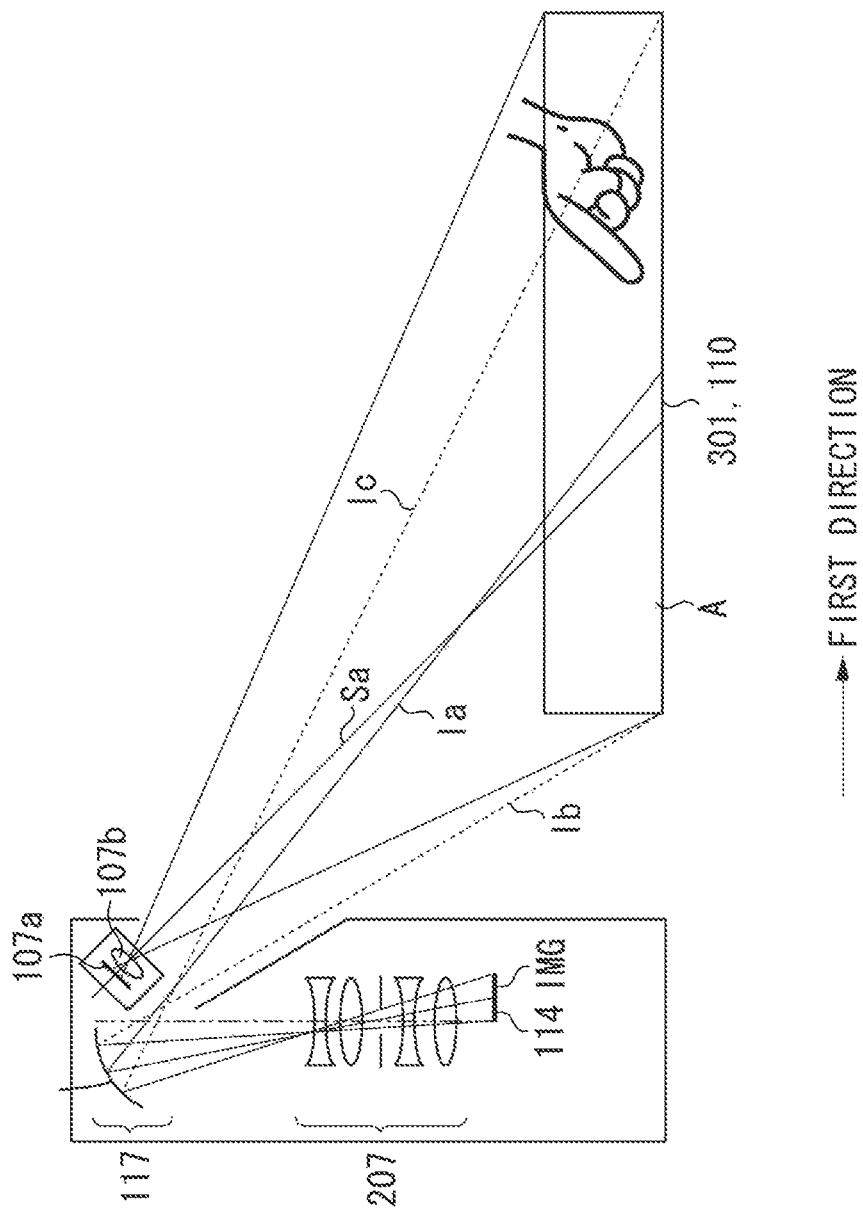
FIG. 5 is a cross-sectional view of a projector and a gesture sensor according to the first exemplary embodiment.

FIG. 4 is a diagram illustrating an overall configuration of the information processing apparatus 109. FIG. 5 is a cross-sectional view illustrating configurations of the camera 105 and the gesture sensor 107. The configuration of the camera 105 is described with reference to FIGS. 4 and 5. The camera 105 includes a CCD sensor 114 as an image sensor. A main frame 113 is fixed to the base 112. A camera attachment 130 is fixed to the main frame 113.

The camera 105 is attached to a camera mount 131 via the camera attachment 130. The CCD sensor 114 is attached in such a manner as to be approximately parallel with the projection surface 110.

A camera lens barrel unit 132 (imaging lens barrel unit) incorporating a plurality of lenses 207 is attached to the camera mount 131, as an imaging optical system. In the camera lens barrel unit 132, an image of the target object is formed on the CCD sensor 114.

The lenses 207 are attached to have an optical axis approximately orthogonal to the projection surface 110.

An imaging mirror 117 is a curved mirror having a recessed shape and attached to the main frame 113.

Reading of the target object placed on the projection surface 110 with the camera 105 is performed as follows. An image of the target object is reflected by the imaging mirror 117 into the camera lens barrel unit 132, is passed through the plurality of lenses 207 (see FIG. 5) in the camera lens barrel unit 132, and is read by the CCD sensor 114. The imaging mirror 117 is disposed on the back of the optical axis.

FIG. 5 is a cross-sectional view illustrating the camera 105, the gesture sensor 107, and an image capturing area.

An image of a certain target object placed on an image capturing surface 301, which is the same plane as the projection surface 110, is formed on an imaging plane IMG as a subject image, via the imaging mirror 117 and the plurality of lenses 207. A light receiving surface of the CCD sensor 114 is arranged on the imaging plane IMG. The imaging plane IMG is shifted toward the right side is performed, relative to the optical axis of the plurality of lenses 207, which is so-called a shift optical system.

<Configuration of Gesture Sensor 107>

The configuration of the gesture sensor 107 is described with reference to FIGS. 4 and 5.

The gesture sensor 107 is attached to the main frame 113. The gesture sensor 107 incorporates an image sensor 107a and at least one lens 107b formed of resin. The gesture sensor 107 is attached to a distal end of the imaging mirror 117.

The gesture sensor 107 needs to ensure detection in an area A with a height of 100 mm from the projection surface 110 so that the movement of the hand or finger over the projection surface 110 can be detected.

The gesture sensor 107 is disposed in an area interfering with none of light beams Ib and Ic defining the image capturing area of the camera 105 and any other light beams between the light beams Ib and Ic. In FIG. 5, Ia indicates an optical axis of the camera 105 and Sa indicates d optical axis of the gesture sensor 107.

<Configuration of Projector 106>

The configuration of the projector 106 is described with reference to FIG. 4.

The projector 106 includes a light source unit 119 (not illustrated) serving as a light source and a projector lens barrel unit 115 (projection lens barrel unit) serving as a projection optical system. A plurality of lenses is arranged in the projector lens barrel unit 115. The light source unit 119 is arranged in a duct 138 and thus is not illustrated in FIG. 4.

The light source unit 119 is connected to the projector lens barrel unit 115 via a bent portion. The light source unit 119 is arranged on the back of the bent portion.

A projection mirror 134 is arranged forward and above the projector lens barrel unit 115. The projection mirror 134 reflects light toward the projection surface 110 so that the image 111 is projected onto the projection surface 110. The bent portion is provided with a reflection mirror 135 that reflects light, emitted from the light source unit 119, toward the projection mirror 134.

A cooling fan 137 and the duct 138 that surrounds the light source are disposed around the light source unit 119. Heat emitted from the light source unit 119 is dissipated with the cooling fan 137 and the duct 138.

<Configuration of Light Source Unit 119>

Figure 6:
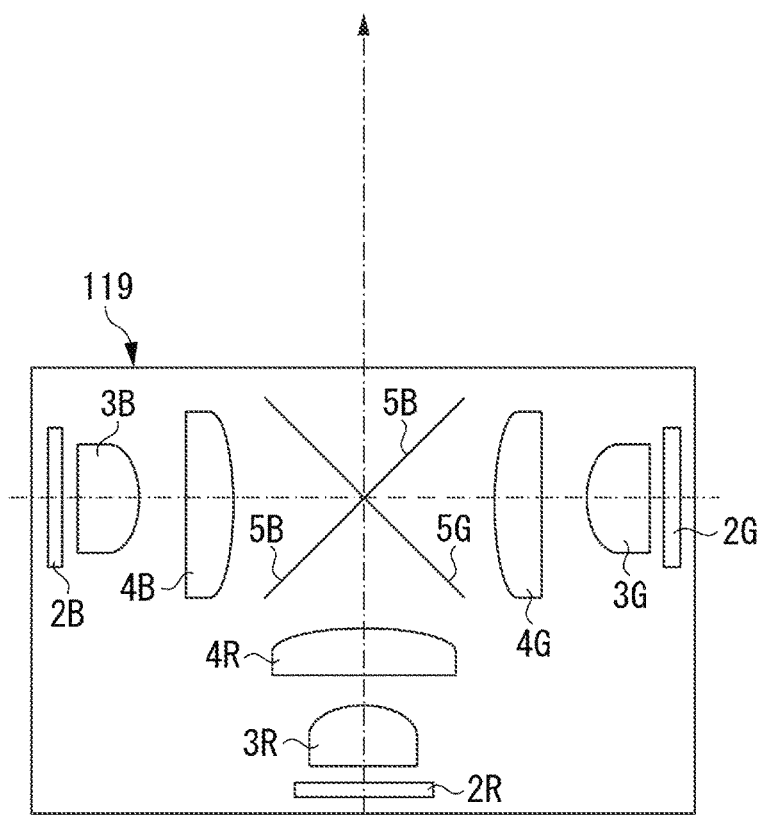
FIG. 6 is a diagram illustrating a configuration of a light source unit according to the first exemplary embodiment.

FIG. 6 is a diagram illustrating a configuration of the light source unit 119.

The light source unit 119 includes a red LED 2R, a green LED 2G, and a blue LED 2B that serve as the light source. Collimator lenses 3R and 4R, collimator lenses 3G and 4G, and collimator lenses 3B and 4B, which convert light into parallel light, are disposed in a direction in which light is emitted from the red LED 2R, in a direction in which light is emitted from the green LED 2G, and in a direction in which light is emitted from the blue LED 2B, respectively. Dichroic mirrors 5B and 5G that combines the light are also disposed in the directions in which the light are respectively emitted from the red LED 2R, the green LED 2G, and the blue LED 2B.

The dichroic mirrors 5B and 5G are each a mirror that transmits or reflects incoming light depending on a wavelength of the incoming light. More specifically, the dichroic mirror 5B reflects light with a blue wavelength component, and transmits light with a red wavelength component and light with a green wavelength component, whereas the dichroic mirror 5G reflects light with a green wavelength component, and transmits light with a red wavelength component and light with a blue wavelength component.

Paths of light beams respectively emitted from the red LED 2R, the green LED 2G, and the blue LED 2B will be described.

The light beam emitted from the red LED 2R passes through the collimator lenses 3R and 4R to become a parallel light beam. Thereafter, since both of the dichroic mirrors 5G and 5B do not reflect light with a red wavelength component, the light beam transmits through the dichroic mirrors 5G and 5B, whereby red light is emitted from the light source unit 119.

The light beam emitted from the blue LED 2B passes through the collimator lenses 3B and 4B to become a parallel light beam. Thereafter, the light beam transmits through the dichroic mirror 5G and is reflected by the dichroic mirror 5B to have its travelling direction shifted by 90°, whereby blue light is emitted from the light source unit 119.

The light beam emitted from the green LED 2G passes through the collimator lenses 3G and 4G to become a parallel light beam. Thereafter, the light beam transmits through the dichroic mirror 5B and is reflected by the dichroic mirror 5G to have its travelling direction shifted by 90°, whereby green light is emitted from the light source unit 119.

<Configuration of Cooling Mechanism for Each Light Source>

A configuration for a cooling mechanism for the light source unit 119 will be described.

The red LED 2R, the green LED 2G, and the blue LED 2B are respectively provided with heat dissipation members 11R, 11G, and 11B.

Figure 7:
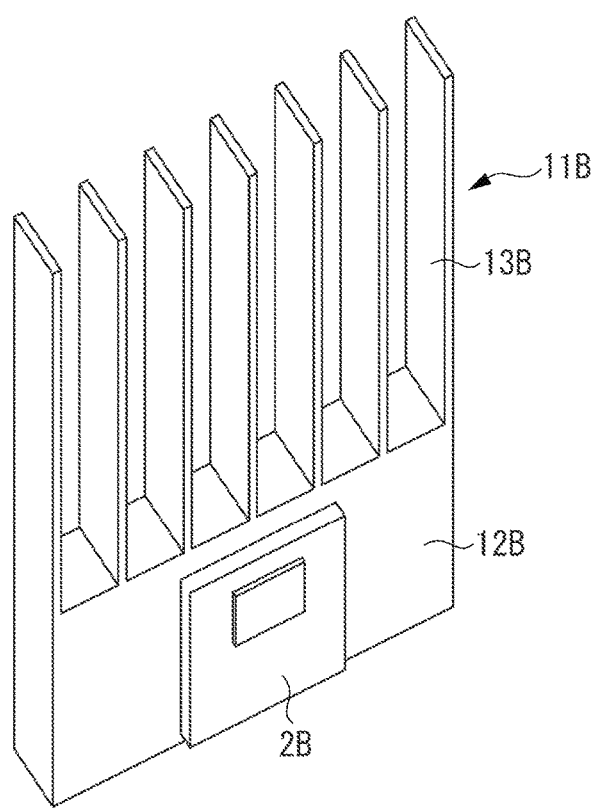
FIG. 7 is a perspective view illustrating a blue light emitting diode (LED) and a heat dissipation member, according to the first exemplary embodiment.

FIG. 7 is a perspective view illustrating the blue LED 2B and the heat dissipation member 11B.

The heat dissipation member 11B includes a heat receiving section 12B and heat dissipation fins 13E that are made of copper.

A heat dissipation surface of the blue LED 2B is in contact with the heat receiving section 12B of the heat dissipation member 11B via a heat conducting sheet (not illustrated). When the blue LED 2B emits light and thus emits heat, the emitted heat is transmitted from the heat dissipation surface of the blue LED 2B to the heat receiving section 12B and to the heat dissipation fins 13B, to be dissipated via the heat dissipation fins 13B.

Figure 8:
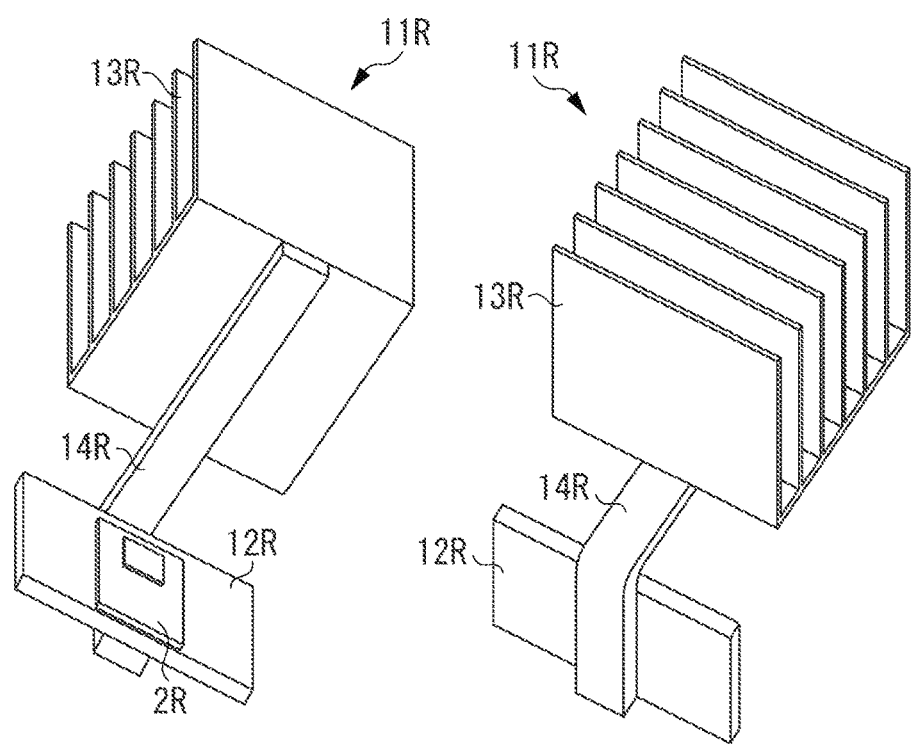
FIG. 8 is a perspective view illustrating a red LED and a heat dissipation member, according to the first exemplary embodiment.

FIG. 8 is a perspective view illustrating the red LED 2R and the heat dissipation member 11R.

The heat dissipation member 11R includes a heat receiving section 12R, a heat pipe 14R, and heat dissipation fins 13R. The heat receiving section 12R and the heat dissipation fins 13R are made of copper. The heat pipe 14R is configured as a vacuumed copper pipe containing therein water as a coolant.

The heat receiving section 12R and the heat dissipation fins 13R are separated from each other and are connected with each other via the heat pipe 14R. When the red LED 2R emits light and thus emits heat, the emitted heat is transmitted from a heat dissipation surface of the red LED 2R to the heat receiving section 12R, to the heat pipe 14R, and to the heat dissipation fins 13E, to be dissipated via the heat dissipation fin 13R.

Figure 9:
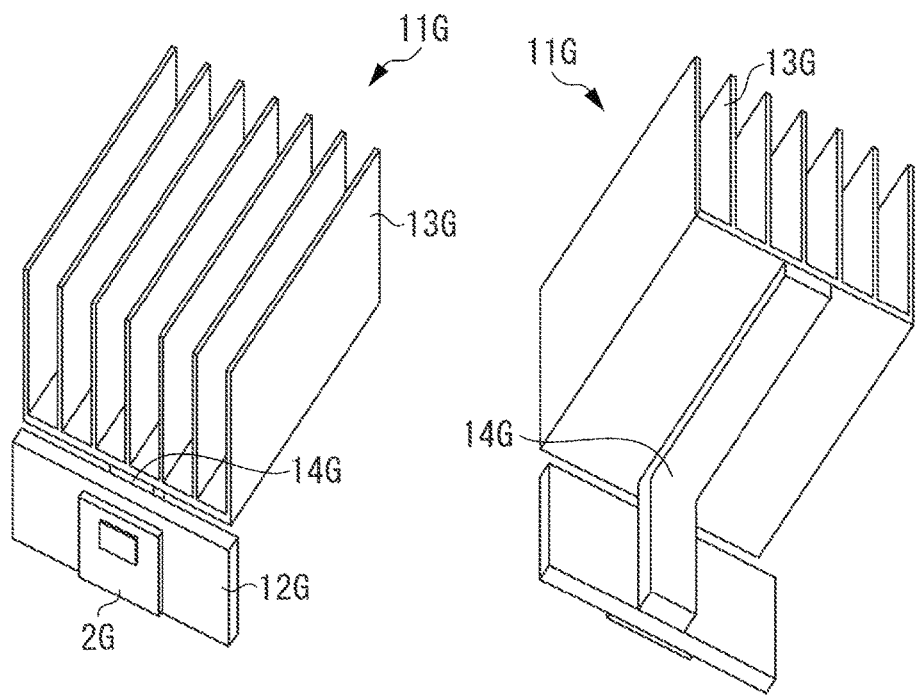
FIG. 9 is a perspective view illustrating a green LED and a heat dissipation member, according to the first exemplary embodiment.

FIG. 9 is a perspective view illustrating the green LED 2G and the heat dissipation member 11G.

The heat dissipation member 11G includes a heat receiving section 12G, a heat pipe 14G, and heat dissipation fins 13G. The heat receiving section 12G and the heat dissipation fins 13G are made of copper. The heat pipe 14G is configured as a vacuumed copper pipe containing therein water as a coolant.

The heat receiving section 12G and the heat dissipation fin 13G are separated from each other and are connected with each other via the heat pipe 14G. When the green LED 2G emits light and thus emits heat, the emitted heat is transmitted from a heat dissipation surface of the green LED 2G to the heat receiving section 12G, to the heat pipe 14G, and to the heat dissipation fins 13G, to be dissipated via the heat dissipation fins 13G.

<Configuration of Cooling Mechanism for Light Source Unit 119>

Figure 10:
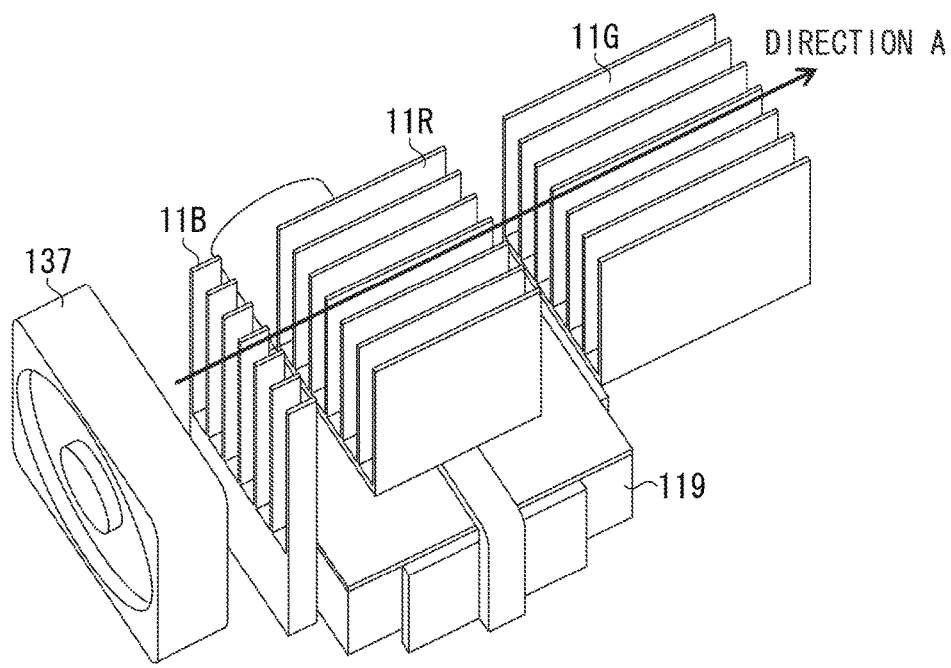
FIG. 10 is a perspective view of a cooling mechanism according to the first exemplary embodiment, in a state where the LEDs of the three colors and the heat dissipation members are assembled.

FIG. 10 is a perspective view illustrating the cooling mechanism in a state where the LEDs of the three colors and the respective heat dissipation members are assembled.

A cooling fan 137 (an air blowing unit) is disposed in front of the heat dissipation member 11B.

The cooling fan 137 is an axial fan that blows air that flows in the duct 138 in a direction. A in the figure. The heat dissipation member 11R is arranged on a downstream side of the heat dissipation member 11E in the air blowing direction.

The heat dissipation member 11G is arranged on the downstream side of the heat dissipation member 11R in the air blowing direction. The heat dissipation member 11B, the heat dissipation member 11R, and the heat dissipation member 11G each have the respective fins orientated in a direction that is the same as the direction in which air is blown from the cooling fan 15. More specifically, the respective fins have their surfaces in parallel with the direction in which air is blown from the cooling fan 15.

The light source unit 119 and the heat dissipation members 11B, 11R, and 11G are arranged in the duct 138. The heat dissipation members 11B, 11R, and 11G are approximately linearly arranged along the air blowing direction A.

Figure 11:
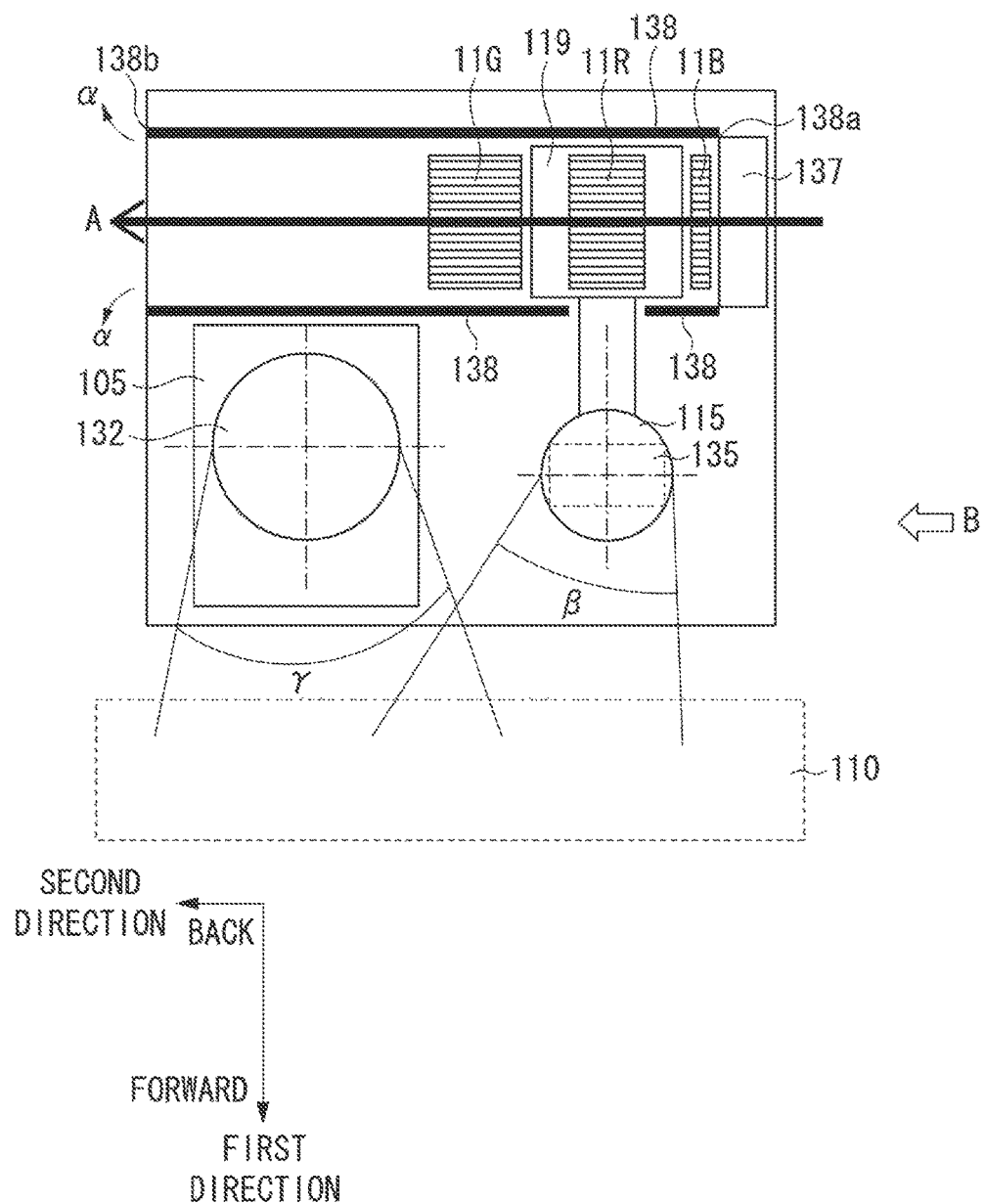
FIG. 11 is a top view illustrating a configuration of a cooling mechanism for the information processing apparatus according to the first exemplary embodiment.
Figure 12:
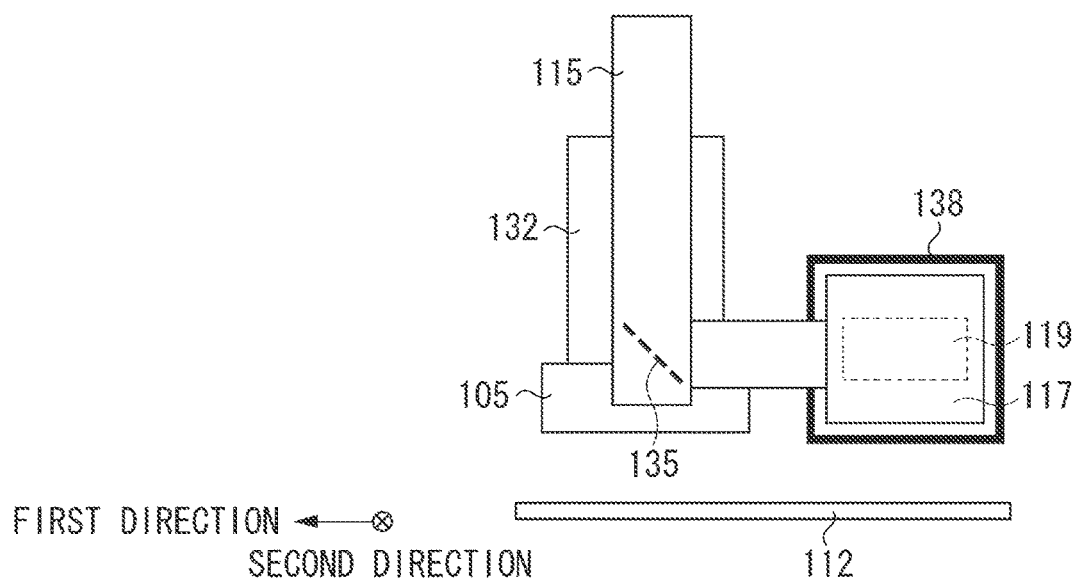
FIG. 12 is a side view illustrating the configuration of the cooling mechanism for the information processing apparatus according to the first exemplary embodiment.

FIG. 11 is a top view of the information processing apparatus 109, illustrating an arrangement of cooling mechanism in the information processing apparatus 109. FIG. 12 is a side view of the information processing apparatus 109 as viewed in a direction B indicated in FIG. 11. A direction toward which the optical axis of the camera 105 travels when the optical axis is projected onto the projection surface 110 is defined as a first direction. A direction that is orthogonal to the first direction is defined as a second direction (the same applies to FIGS. 1 and 5).

Components that are unnecessary for the description, such as the imaging mirror 117, the projection mirror 134, and the main, frame 113 are not illustrated in FIGS. 11 and 12.

A line γ represents an image capturing area of the camera 105. A line β represents an image projection area of the projector 106. The projector lens barrel unit 115 is arranged to overlap with the camera lens barrel unit 132 as viewed in the second direction FIG. 12). With this arrangement, the image capturing area γ of the camera 105 is not blocked by the projector lens barrel unit 115, and the image projection area β of the projector 106 is not blocked by the camera lens barrel unit 132. If the projector lens barrel unit 115 and the camera lens barrel unit 132 are arranged in such a manner that they do not overlap with each other as viewed in the second direction (e.g. the projector lens barrel unit 115 is arranged backward and the camera lens barrel unit 132 is arranged forward), the image projection area β of the projector 106 may be blocked by the camera lens barrel unit 132.

The light source unit 119 is arranged so as not to overlap with the camera 105 and the camera lens barrel unit 132 as viewed in the second direction. With this arrangement, the duct 138 described below can be arranged at an appropriate position.

The cooling air blown from the cooling fan 137 flows in the duct 138. The duct 138 is arranged so that the cooling air blown from the cooling fan 137 flows in the second direction that is orthogonal to the first direction.

If the duct 138 is arranged so that the cooling air flows in the first direction, usability may be lowered. More specifically, if the cooling fan 137 is arranged on the back side to blow the cooling air toward the forward side, the cooling air may be blown onto the user on a side the projection surface 110. Alternatively, if the cooling 137 is arranged on the front side to blow the cooling air toward the back side, the cooling fan 137 is disposed close to the user and thus e user may feel that the sound from the cooling fan 137 is noisy.

An upstream opening 138*a* and a downstream opening 138*b* are respectively on upstream and downstream sides of the duct 138 in the direction in which the air is blown from the cooling fan 137. The downstream opening 138*b* is disposed on the downstream side of the camera 105 in the air blowing direction A, that is, the second direction. The cooling air discharged from the downstream opening 138*b* spreads outward from the duct 138, as indicated by arrows α. With the downstream opening 138*b* provided as described above, the cooling air spreads in the directions indicated by the arrows α and thus is prevented from being blown onto the camera 105. The duct 138 linearly extends without bending, from the upstream opening 138 to the downstream opening 138*b*, in the direction in which the air is blown from the cooling fan 137 whereby the cooling air flows with no pressure loss.

The light emitted from the light source unit 119 in an approximately horizontal direction is reflected by reflection mirror 135 to a vertical direction, and travels to the projection mirror 134 through the projector lens barrel unit 115. The reflection mirror 135 is provided, so that the projector lens barrel unit 115 can be arranged at a portion not above the light source unit 119. With this configuration, if air heated by the heat emitted from the light source of the light source unit 119 rose above, the projector lens barrel unit 115 would not be heated by the rising air.

A second exemplary embodiment is described with reference to FIG. 13. The second exemplary embodiment is the same as the first exemplary embodiment except that the reflection mirror 135 is not used, and that components of the projector 106 are arranged differently. Thus, only the points different from the first exemplary embodiment will be described.

Figure 13:
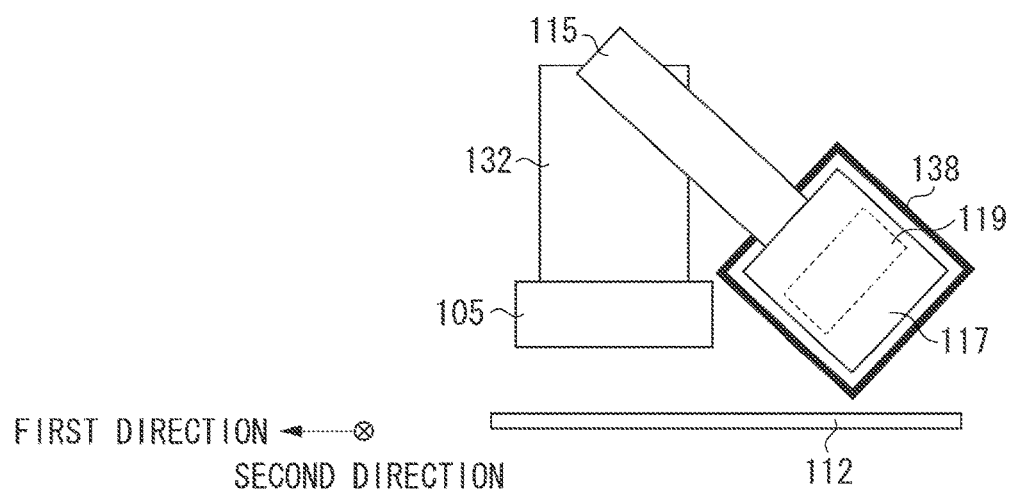
FIG. 13 is a side view illustrating a configuration of a cooling mechanism for an information processing apparatus according to a second exemplary embodiment.

FIG. 13 is a side view of the information processing apparatus 109 as viewed in the direction B indicated in FIG. 11. In the present exemplary embodiment, the light source unit 119 and the projector lens barrel unit 115 are obliquely and upwardly inclined with respect to the horizontal direction, thereby eliminating the use of the reflection mirror 135.

The advantageous effects that are the same as those in the first exemplary embodiment can be obtained in the second exemplary embodiment.

A third exemplary embodiment is described with reference to FIG. 14. The third exemplary embodiment is the same as the first exemplary embodiment except that the reflection mirror 135 is not used, and that the components of the projector 106 are arranged differently. Thus, only the points different from the first exemplary embodiment will be described.

Figure 14:
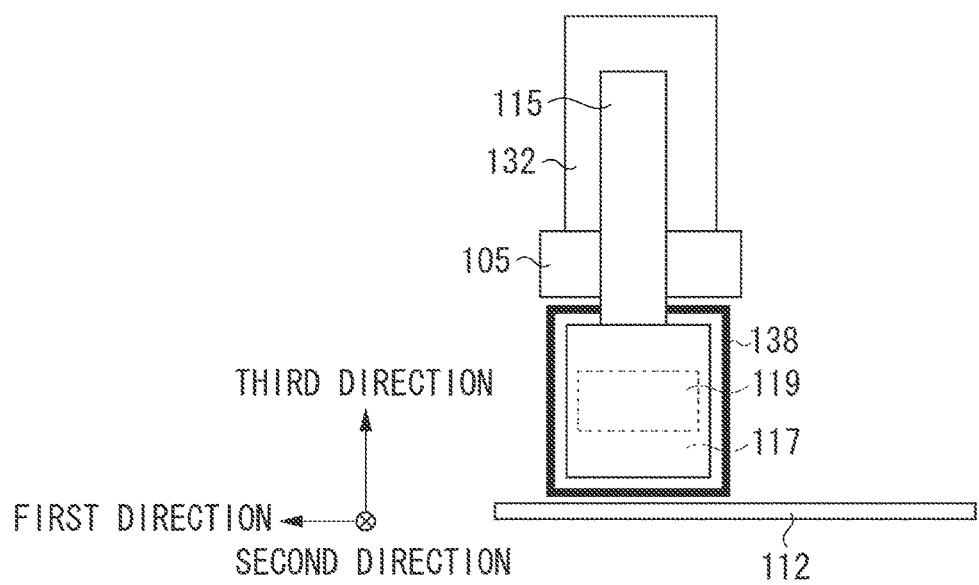
FIG. 14 is a side view illustrating a configuration of a cooling mechanism for an information processing apparatus according to a third exemplary embodiment.

FIG. 14 is a side view of the information processing apparatus 109 as viewed in the direction B indicated in FIG. 11. In FIG. 14, a third direction is orthogonal to the first and the second directions. In the present exemplary embodiment, as viewed in the second direction, the light source unit 119 is arranged at a position different from those of the camera 105 and the camera lens barrel unit 132 in the third direction, and the light source unit 119 is arranged to overlap with the camera 105 and the camera lens barrel unit 132 in the first direction, thereby eliminating the use of the reflection mirror 135. The advantageous effects that are the same as those in the first exemplary embodiment can be obtained in the third exemplary embodiment. However, in the present configuration, the information processing apparatus 109 as a whole has a long length in the third direction (that is a height direction). This is because each of the projector lens barrel unit 115 and the camera lens barrel unit 132 needs to have a certain amount of length to have sufficient optical performance. As such, the configurations in the first and the second exemplary embodiments more preferable when downsizing of the information processing apparatus 109 in the height direction is desired.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-169629, filed Aug. 28, 2015, which is hereby incorporated by reference herein in its entirety.

What is claimed is:

1. An image capturing apparatus comprising:
a mirror;
a projection unit that includes a light source and a projection lens barrel unit, and is configured to project an image onto a projection surface, wherein projection light emitted from the light source passes through the projection lens barrel unit and is reflected by the mirror;
an image capturing unit configured to capture an image of a target object placed on the projection surface;
an imaging lens barrel unit, wherein target light coining from the target object is reflected by the mirror, passes through the imaging lens barrel unit, and is received by the image capturing unit;
an air blowing unit configured to blow air for cooling the light source; and
a duct through which the air blown by the air blowing unit is guided to the light source,
wherein
the mirror is disposed above the projection unit, the imaging lens barrel unit, and the image capturing unit,
a plane defined by a first direction and a second direction perpendicular to the first direction is orthogonal to a vertical direction,
the projection lens barrel unit is arranged to overlap with the imaging lens barrel unit in the vertical direction,
the projection lens barrel unit is arranged to overlap with the imaging lens barrel unit in the first direction,
the projection lens barrel unit is arranged so as not to overlap with the imaging lens barrel unit in the second direction,
the light source is arranged so as not to overlap with the imaging lens barrel unit, the image capturing unit and the projection lens barrel unit in the first direction, and
wherein the duct is arranged in such a manner that the air blown from the air blowing unit travels in the second direction.

2. The image capturing apparatus according to claim 1, wherein the projection unit includes the light source, the projection lens barrel unit and a reflection mirror, wherein the reflection mirror is arranged between the light source and the projection lens barrel unit, and wherein light emitted from the light source is guided to the projection lens barrel unit via the reflection mirror.

3. The image capturing apparatus according to claim 1, wherein the duct is formed to linearly extend from an upstream opening of the duct to a downstream opening of the duct.

4. The image capturing apparatus according to claim 3, wherein a downstream opening of the duct is disposed downstream of the image capturing unit in the second direction, and
wherein the air blowing unit disposed on the upstream opening of the duct.

5. The image capturing apparatus according to claim 1, wherein the mirror comprises
a projection mirror configured to reflect the projection light that has passed through the projection lens barrel unit; and
an imaging mirror configured to reflect the target light coining from the target object.

6. The image capturing apparatus according to claim 1, further comprising a heat dissipation fin configured to dissipate heat of the light source,
wherein the heat dissipation fin is oriented in a direction that is same as the direction in which the air is blown from the air blowing unit.

* * * * *